United States Patent
Shimazaki et al.

(10) Patent No.: US 9,268,512 B2
(45) Date of Patent: Feb. 23, 2016

(54) INFORMATION PROCESSING APPARATUS, METHOD OF CONTROLLING INFORMATION PROCESSING APPARATUS, AND COMPUTER-READABLE STORAGE MEDIUM

(71) Applicant: CANON KABUSHIKI KAISHA, Tokyo (JP)

(72) Inventors: Atsushi Shimazaki, Yokohama (JP); Michihei Murayama, Tachikawa (JP); Shigeru Mizoguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/593,474

(22) Filed: Jan. 9, 2015

(65) Prior Publication Data

US 2015/0220292 A1     Aug. 6, 2015

(30) Foreign Application Priority Data

Jan. 31, 2014   (JP) .................................. 2014-017735

(51) Int. Cl.
  *G06F 3/12* (2006.01)
  *G06F 17/22* (2006.01)
(52) U.S. Cl.
  CPC ............ *G06F 3/1236* (2013.01); *G06F 3/1208* (2013.01); *G06F 3/1246* (2013.01); *G06F 3/1285* (2013.01); *G06F 17/2247* (2013.01)
(58) Field of Classification Search
  CPC ... G06F 3/1228; G06F 3/1236; G06F 3/1284; G06F 3/1286; H04N 1/00307; H04N 1/00347; H04N 1/00244; H04N 1/00297; H04N 1/00318; H04N 1/00888; H04N 1/32518; H04N 1/32534; H04N 2201/0017
  USPC ............. 358/1.15, 1.13, 1.14, 1.16, 296, 450, 358/14.01, 14.02, 473, 552, 553; 709/201, 709/202, 203, 218, 219, 225
  See application file for complete search history.

(56) References Cited

U.S. PATENT DOCUMENTS

| | | | |
|---|---|---|---|
| 7,193,740 B2 * | 3/2007 | Matsunaga et al. .......... | 358/1.15 |
| 7,268,902 B2 * | 9/2007 | Hino ............................ | 358/1.15 |
| 7,532,335 B2 * | 5/2009 | Matsunaga et al. .......... | 358/1.13 |
| 7,551,301 B2 * | 6/2009 | Yamaguchi et al. ......... | 358/1.15 |
| 7,707,581 B2 * | 4/2010 | Inoue ........................... | 718/105 |
| 7,760,373 B2 * | 7/2010 | Oshima ........................ | 358/1.13 |
| 8,065,362 B2 * | 11/2011 | Greven et al. ................ | 709/203 |
| 8,233,176 B2 * | 7/2012 | Sasaki ......................... | 358/1.15 |
| 8,675,226 B2 * | 3/2014 | Gha ............................. | 358/1.15 |

(Continued)

FOREIGN PATENT DOCUMENTS

| | | |
|---|---|---|
| JP | 2001-209639 | 8/2001 |
| JP | 2005-031983 | 2/2005 |

*Primary Examiner* — Negussie Worku
(74) *Attorney, Agent, or Firm* — Fitzpatrick, Cella, Harper & Scinto

(57) ABSTRACT

Structured language data as a processing target is acquired via a first communication path or a second communication path. A rule corresponding to a communication path used for the acquisition is selected from a first rule and a second rule which respectively correspond the first communication path and the second communication path and define processing methods for the structured language data. The acquired structured language data as the processing target is processed in accordance with a processing method defined in a selected rule. Processing is executed based on the selected rule in either case that the first rule or the second rule is selected.

15 Claims, 8 Drawing Sheets

(56) References Cited

U.S. PATENT DOCUMENTS

| | | | |
|---|---|---|---|
| 8,717,615 B2* | 5/2014 | Kim | 358/1.18 |
| 8,719,374 B1* | 5/2014 | Reiz | 709/217 |
| 2003/0217071 A1* | 11/2003 | Kobayashi et al. | 707/102 |
| 2004/0252333 A1* | 12/2004 | Blume et al. | 358/1.15 |
| 2007/0150682 A1* | 6/2007 | Ogasawara et al. | 711/163 |
| 2008/0117475 A1* | 5/2008 | Ozawa et al. | 358/435 |
| 2008/0120282 A1* | 5/2008 | Liberty et al. | 707/4 |
| 2013/0247117 A1* | 9/2013 | Yamada et al. | 725/93 |

* cited by examiner

INFORMATION PROCESSING APPARATUS, METHOD OF CONTROLLING INFORMATION PROCESSING APPARATUS, AND COMPUTER-READABLE STORAGE MEDIUM

BACKGROUND OF THE INVENTION

1. Field of the Invention

The present invention relates to an information processing technique of processing structured language data.

2. Description of the Related Art

Recently, a printing apparatus includes various types of communication I/Fs, and allows various types of host devices to directly print. These communication I/Fs include a USB I/F, Network I/F, infrared I/F, and Bluetooth® I/F. In addition, host devices include a cellular phone, digital camera, and digital TV.

A Network I/F and a Bluetooth I/F are available as communication I/Fs (standardized) which can transmit, receive, and print XHTML-Print data. There are standards called UPnP and BPP (Basic Printing Profile) for the respective I/Fs. These standards are defined to perform communication in accordance with their respective defined schemes and print by rendering XHTML-Print data in accordance with defined schemes. Each standard also defines the specification of adopted XHTML-Print and the specifications of a style sheet and default style sheet to be used.

The following processing schemes are available as methods of selectively using different style sheets when displaying or printing structured languages such as XHTML-Print.

Japanese Patent Laid-Open No. 2001-209639 discloses an arrangement configured to decide and display a processing method for each style sheet based on user's selection when combining a style sheet and an associated structured language document and displaying the result.

Japanese Patent Laid-Open No. 2005-31983 discloses an arrangement configured to provide a web page which can be easily recognized by various users, by changing the display form of a web page by generating and applying a style sheet to which proper change information is applied.

A printing apparatus including a Network I/F or Bluetooth I/F capable of transmitting, receiving, and printing XHTML-Print data prints in accordance with the scheme defined in the UPnP or BPP standard. In order to perform printing complying with each standard, it is necessary to generate print data by a processing method defined in each standard.

The technique disclosed in Japanese Patent Laid-Open No. 2001-209639, however, needs to decide a processing method for a style sheet in accordance with user's selection. For this reason, the user must perform a selecting operation. In some case, the user may not select any style sheet complying with the standard of an I/F.

The technique disclosed in Japanese Patent Laid-Open No. 2005-31983 is a technique of changing a display form by applying a style sheet to which change information is applied. However, a style sheet accompanying data is overwritten or changed without any consideration to an I/F when the data is received. In some case, therefore, it is not possible to apply a style sheet complying with the standard of the I/F.

SUMMARY OF THE INVENTION

The present invention provides an image processing technique which can properly process processing target data in accordance with a communication path used for the acquisition of data.

In order to achieve the above object, an information processing apparatus according to the present invention has the following arrangement. That is, an information processing apparatus which processes structured language data, the apparatus comprising: an acquisition unit configured to acquire structured language data as a processing target via one of a first communication path and a second communication path; a selection unit configured to select a rule corresponding to a communication path used for the acquisition by the acquisition unit from a first rule and a second rule which respectively correspond the first communication path and the second communication path and define processing methods for the structured language data; and a processing unit configured to process structured language data as a processing target acquired by the acquisition unit in accordance with a processing method defined in a rule selected by the selection unit, wherein the processing unit executes the processing based on the selected rule in either case that the first rule or the second rule is selected by the the selection unit.

According to the present invention, it is possible to properly process processing target data in accordance with a communication path used for the acquisition of data.

Further features of the present invention will become apparent from the following description of exemplary embodiments (with reference to the attached drawings).

DESCRIPTION OF THE EMBODIMENTS

An embodiment of the present invention will be described in detail below with reference to the accompanying drawings.

Figure 1:
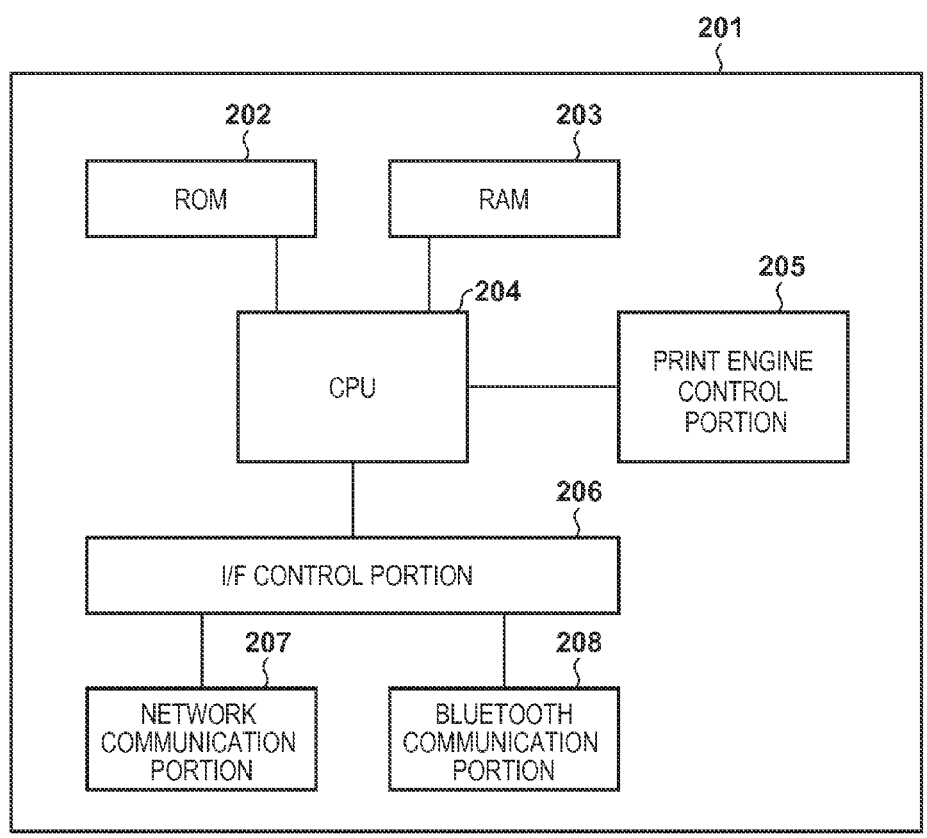
FIG. 1 is a block diagram showing the arrangement of the hardware arrangement of a printing apparatus.

FIG. 1 is a block diagram showing a schematic hardware (H/W) arrangement of a printing apparatus.

As shown in FIG. 1, a printing apparatus 201 includes a print engine control portion 205, a CPU 204, a ROM 202, a RAM 203, an I/F control portion 206, a network communication portion 207, and a Bluetooth communication portion 208. When performing data transmission/reception, first of all, the physical layer and data link layer of the printing apparatus are connected to those of each transmission apparatus according to schemes defined in the respective standards of Network (wired LAN, for example, Ethernet®) and Bluetooth. The printing apparatus 201 and each communication device then perform transmission/reception of XHTML-Print data in accordance with UPnP and BPP standards as upper layer protocols defined in the respective standards.

Figure 2:
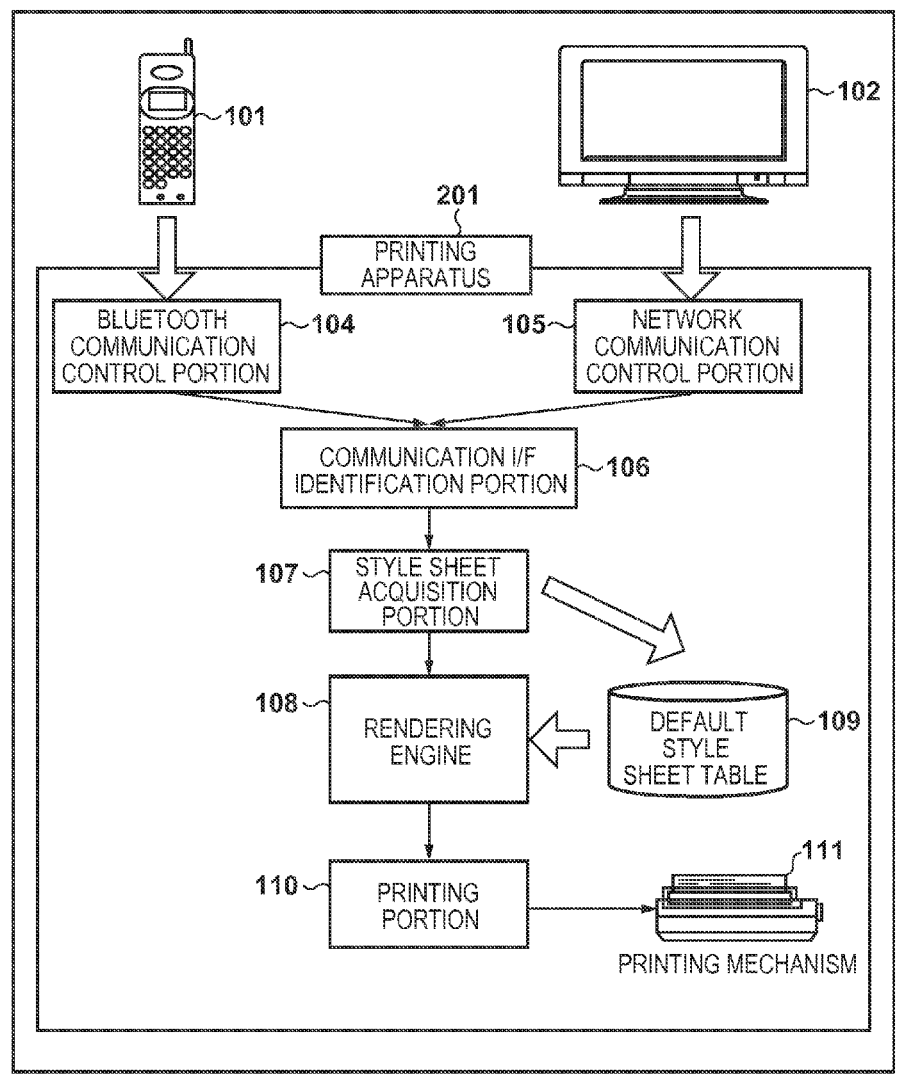
FIG. 2 is a block diagram showing the arrangement of the software arrangement of the printing apparatus.
Figure 3:
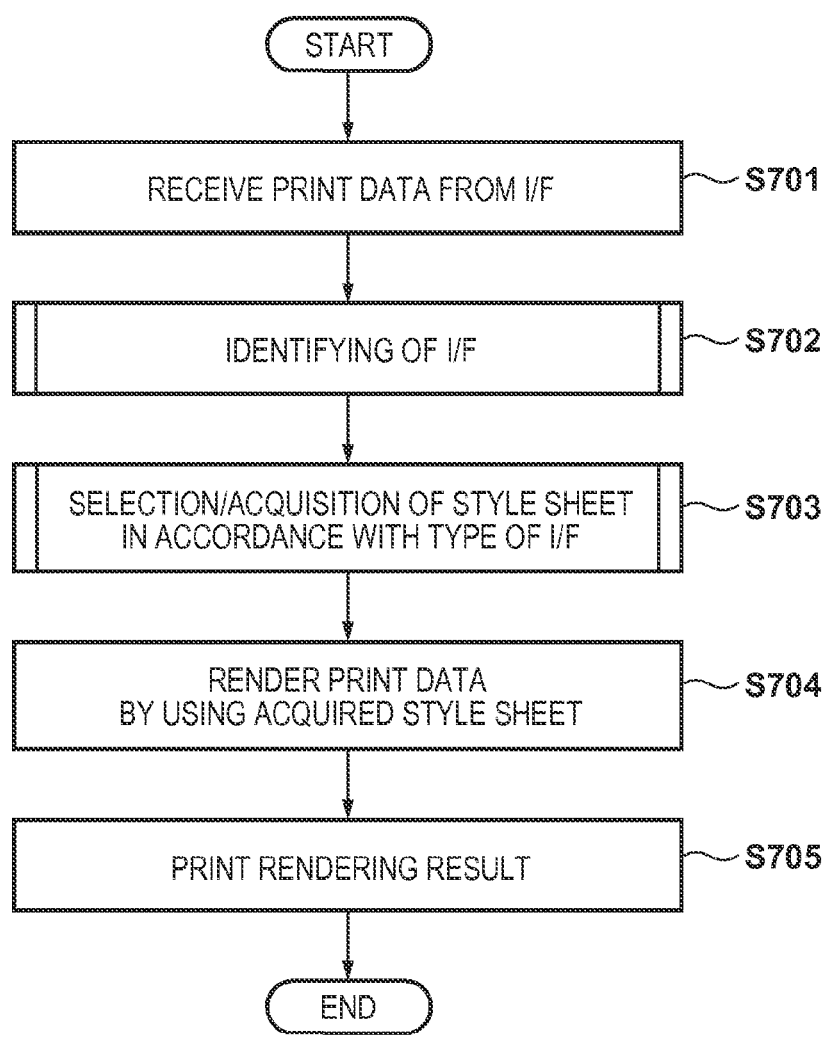
FIG. 3 is a flowchart showing processing when the printing apparatus prints.

FIG. 2 is a block diagram showing a schematic software (S/W) arrangement of the printing apparatus. FIG. 3 is a flowchart showing processing by the printing apparatus. An outline of processing by the printing apparatus according to this embodiment will be described with reference to FIGS. 2 and 3. Note that programs corresponding to the functions of the software shown in FIG. 2 are stored in the ROM 202 of the printing apparatus 201, and the processing shown in FIG. 2 is implemented by making the CPU 204 of the printing apparatus 201 execute the programs in the RAM 203. Likewise, the processing in the flowchart shown in FIG. 3 is implemented by making the CPU 204 execute the above programs and operate as the functions shown in FIG. 2.

As shown in FIG. 2, the printing apparatus 201 includes a Bluetooth communication control portion 104 and a Network communication control portion 105 which are respectively used to perform transmission/reception of data to/from a transmission apparatus 101 and a transmission apparatus 102. The Bluetooth communication control portion 104 is a module which controls the Bluetooth communication portion 208 as a Bluetooth I/F. Likewise, the Network communication control portion 105 is a module which controls the network communication portion 207 as a Network I/F. In addition, a default style sheet table 109 storing in advance default style sheets respectively defined for a Bluetooth I/F and a Network I/F is stored in, for example, the ROM 202.

In this case, a style sheet is a rule for defining a processing method (an output form (a display form, print form, and the like), layout, color, font, size, modification, and the like) for processing data.

In this embodiment, such a style sheet is prepared for each communication path, and the CPU 204 selects a style sheet corresponding to a communication path when performing rendering. An image to be printed is then generated by performing rendering using the selected style sheet.

The reason why a style sheet corresponding to a communication path is selected in this manner will be described below.

Because of the difference between the times when the UPnP and BPP standards were defined, the specifications of style sheets corresponding to the XHTML-Print specification to which the respective standards refer sometimes differ from each other. Even with the same XHTML-Print data, therefore, the print result obtained when the printing apparatus receives data in accordance with the UPnP standard sometimes differs from that obtained when the printing apparatus receives data in accordance with the BPP standard.

For this reason, it is necessary to perform rendering by a method corresponding to the I/F which has received XHTML-Print data. For example, as shown in FIG. 1, when the printing apparatus simultaneously including both a Network I/F and a Bluetooth I/F receives XHTML-Print data via the Network I/F UPnP, it is necessary to print the data upon rendering it by the scheme defined in the UPnP standard. When the apparatus has received XHTML-Print data via the Bluetooth I/F BPP, it is necessary to print the data upon rendering it by the scheme defined in the BPP standard.

In this embodiment, therefore, a style sheet is selected in accordance with the I/F used for the reception of XHTML-Print data. This makes it possible to render print data in different formats corresponding to the respective communication standards (communication paths) by a rendering engine 108. That is, the printing apparatus 201 can render print data in different formats corresponding to communication standards by selecting style sheets corresponding to the communication paths for the rendering engine 108 as software for rendering.

In addition, for example, in order to perform rendering by methods respectively corresponding to the Network I/F and the Bluetooth I/F, it is conceivable to mount rendering engines respectively corresponding to the two I/Fs. However, the scheme of performing rendering in accordance with the respective standards sometimes requires a large storage area for rendering engines in a memory such as a ROM. Furthermore, in addition to the Network I/F and the Bluetooth I/F, the third communication I/F capable of printing XHTML-Print data may appear. In this case, it is necessary to further increase the number of rendering engines. This may lead to a further increase in storage area for the rendering engines.

In this embodiment, therefore, in either case that which one of the two communication paths is used to receive XHTML-Print data, rendering is performed by the rendering engine common to the two communication paths. This makes it possible to perform rendering corresponding to a communication path without mounting rendering engines respectively corresponding to the communication paths. This makes it unnecessary for the printing apparatus 201 to prepare rendering engines for rendering print data corresponding to the respective communication standards.

In addition, the rendering engine is not limited to software executed by the CPU 204 and may be hardware such as a circuit different from the CPU 204. In this case as well, according to this embodiment, one piece of hardware can perform rendering in accordance with a style sheet selected in accordance with a communication path without providing pieces of hardware respectively corresponding to a plurality of communication paths.

Note that when the rendering engine is implemented by hardware in this manner, either the CPU 204 or the rendering engine may select a style sheet.

The printing apparatus 201 receives print data (for example, XHTML-Print data) via the Bluetooth communication control portion 104 or the Network communication control portion 105 in S701. The printing apparatus 201 stores the received print data in a storage medium such as a work buffer (not shown) in S702. In this case, a communication I/F identification portion 106 identifies one of the Bluetooth I/F and the Network I/F from which the print data is being received. The details of the processing in S702 will be described later with reference to FIG. 4.

In S703, based on the identification result obtained by the communication I/F identification portion 106 in S702, the printing apparatus 201 causes a style sheet acquisition portion 107 to select a default style sheet for the I/F indicated by the identification result from the default style sheet table 109 and acquire the selected style sheet. The details of the processing in S703 will be described later with reference to FIG. 5.

In S704, the printing apparatus 201 causes the rendering engine 108 to render the print data by using the default style sheet acquired by the style sheet acquisition portion 107. Note that although a style sheet for the I/F used to receive the print data is selected in S703, the rendering engine 108 performs rendering in S704 in either case the I/F is the Bluetooth I/F or the Network I/F.

In S705, the printing apparatus 201 controls a printing mechanism 111 by executing a program corresponding to a printing portion 110 to print the rendered print data.

Figure 4:
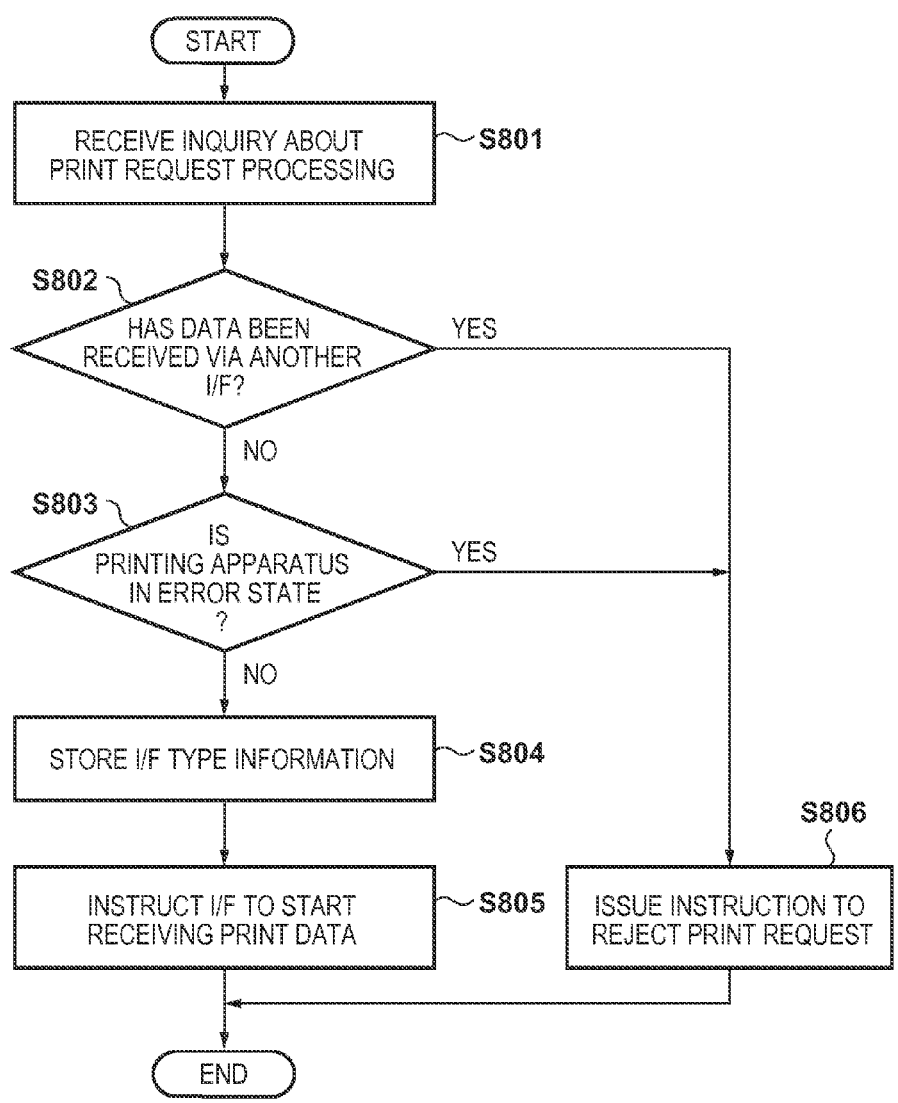
FIG. 4 is a flowchart showing processing when the printing apparatus identifies the I/F which has received print data.

The processing performed when the communication I/F identification portion 106 identifies, in S702 in FIG. 3, the I/F which has received print data will be described below with reference to the flowchart of FIG. 4. Note that a program corresponding to the processing shown in the flowchart of FIG. 4 is stored in the ROM 202 of the printing apparatus 201, and the processing shown in FIG. 4 is implemented by making the CPU 204 of the printing apparatus 201 execute the program in the RAM 203.

Upon receiving a print request from the transmission apparatus 101 or the transmission apparatus 102, the Bluetooth communication control portion 104 or the Network communication control portion 105 inquires the communication I/F identification portion 106 whether it is possible to print.

In S801, the communication I/F identification portion 106 receives the inquiry about the print request from the I/F. Upon receiving the inquiry, the communication I/F identification portion 106 determines in S802 whether any print data has already been received via another I/F. If no print data has been received via another I/F (NO in S802), the communication I/F identification portion 106 subsequently determines in S803 whether the printing apparatus 201 is in the error state.

If the printing apparatus 201 is not in the error state (NO in S803), the communication I/F identification portion 106 stores, in the RAM 203 in S804, I/F type information indicating the type of I/F which has received the inquiry. In S805, the communication I/F identification portion 106 sends, to the I/F which has received the inquiry, a response indicating the permission to receive the print data, and issues an instruction to start data reception.

In contrast, if another I/F has received print data (YES in S802), or the printing apparatus 201 is in the error state (YES in S803), the communication I/F identification portion 106 issues in S806, to the I/F which has received the inquiry, an instruction to reject a print request.

Figure 5:
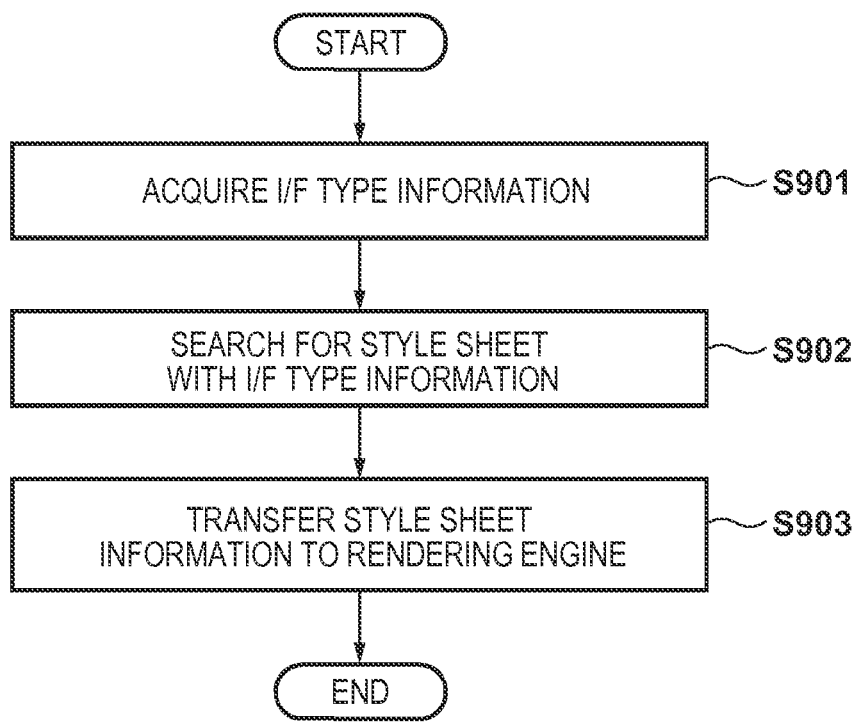
FIG. 5 is a flowchart showing processing when the printing apparatus acquires a default style sheet corresponding to the type of I/F.

The processing in which the style sheet acquisition portion 107 acquires a default style sheet corresponding to the type of I/F in S703 in FIG. 3 will be described with reference to the flowchart of FIG. 5 and FIG. 6. Note that a program corresponding to the processing shown in the flowchart of FIG. 5 is stored in the ROM 202 of the printing apparatus 201, and the processing shown in FIG. 5 is implemented by making the CPU 204 of the printing apparatus 201 execute this program in the RAM 203.

Figure 6:
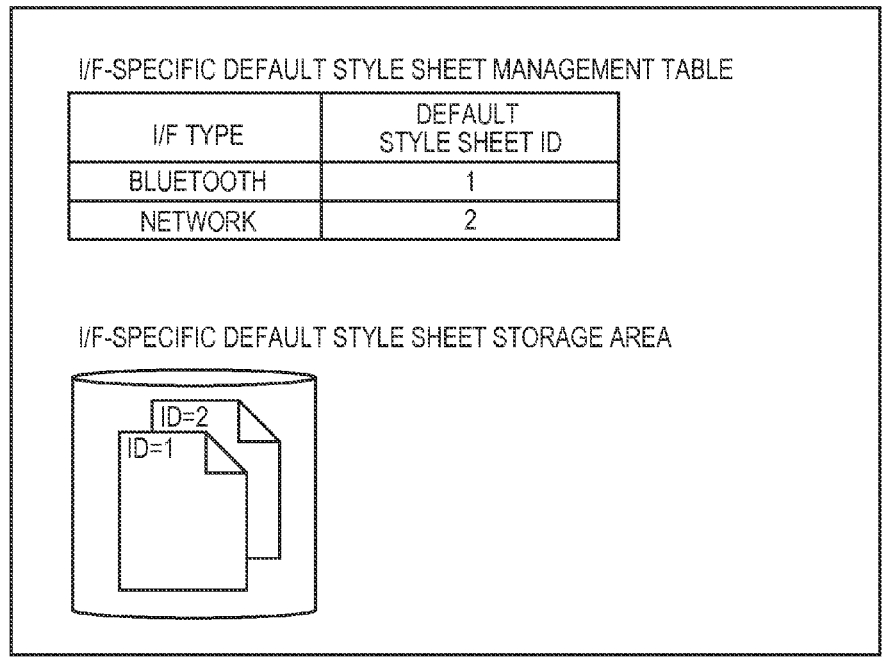
FIG. 6 is a view showing the detailed arrangement of a default style sheet table.

In this case, FIG. 6 shows the detailed arrangement of the default style sheet table 109, which holds an I/F-specific default style sheet management table which manages an ID for uniquely identifying a default style sheet for each I/F type in association with a corresponding I/F type. In addition, the default style sheet table 109 has an I/F-specific default style sheet storage area for storing a default style sheet corresponding to each ID.

In S901, the style sheet acquisition portion 107 acquires I/F type information stored in advance in the RAM 203 by the communication I/F identification portion 106. Subsequently, in S902, the style sheet acquisition portion 107 acquires the default style sheet ID assigned to the I/F indicated by the acquired I/F type information by searching the I/F-specific default style sheet management table managed by the default style sheet table 109. In S903, the style sheet acquisition portion 107 then transfers the default style sheet ID to the rendering engine 108.

With this operation, the rendering engine 108 acquires a default style sheet corresponding to the ID from the I/F-specific default style sheet storage area managed by the default style sheet table 109. The rendering engine 108 then renders the print data by using the acquired default style sheet.

Figure 7:
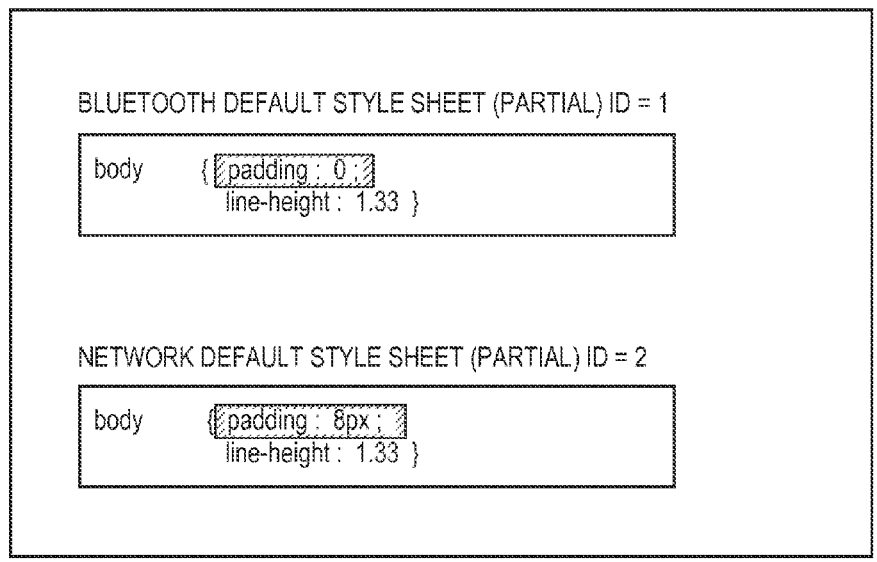
FIG. 7 is a view showing an example of a default style sheet predetermined for each type of I/F in the printing apparatus.

FIG. 7 shows examples of default style sheets respectively predetermined by the printing apparatus 103 for the Bluetooth I/F and the Network I/F. In the default style sheet for the Bluetooth I/F, the value of the "padding" property of the "body" element is designated as "0". On the other hand, in the default style sheet for the Network I/F, the value of the "padding" property of the "body" element is designated as "8px". These two default style sheets are stored in the default style sheet table 109 in advance.

Note that the "padding" property defines, as the padding (padding-like space) of an element, the space inside the border added to the element. In addition, the background color of the element is applied to the space portion without any change.

Figure 8:
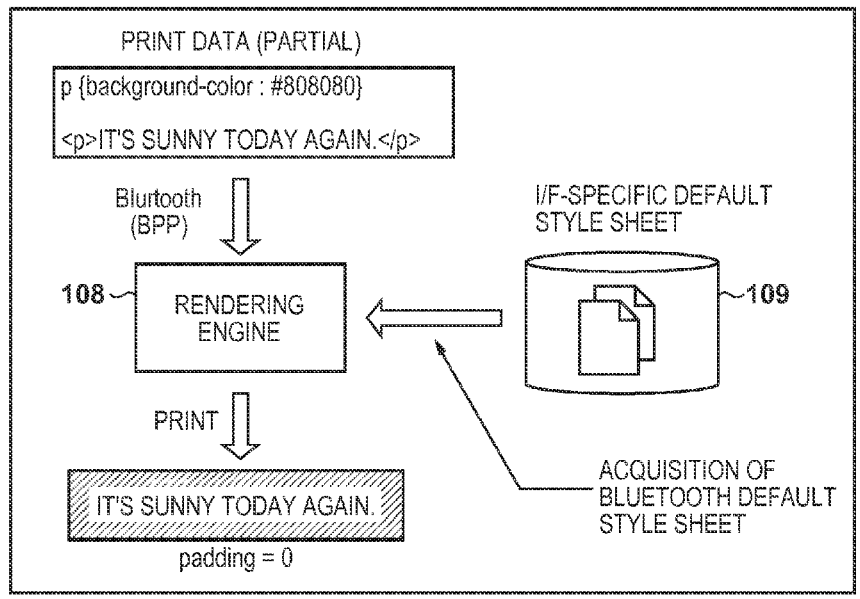
FIG. 8 is a view showing an example of processing when the printing apparatus prints via a Bluetooth I/F.

FIG. 8 shows an example of the processing performed when the printing apparatus 103 receives XHTML-Print data as print data via the Bluetooth I/F and an example of printing. The XHTML-Print data contains a text character string and the designation of a property which designates, as gray, the background color of a text for clarifying the degree of influence of the value of the "padding" property.

When the printing apparatus 103 receives XHTML-Print data via the Bluetooth BPP, the communication I/F identification portion 106 discriminates that the XHTML-Print data has been received from the Bluetooth I/F. The style sheet acquisition portion 107 acquires the default style sheet for the Bluetooth I/F shown in FIG. 7 from the default style sheet table 109. The rendering engine 108 renders the XHTML-Print data by using the acquired default style sheet for the Bluetooth I/F. As shown in FIG. 8, as a result of the rendering, a print result without any padding around the text is obtained, in which the designation of "padding=0" designated on the default style sheet for the Bluetooth I/F shown in FIG. 7 is valid.

Figure 9:
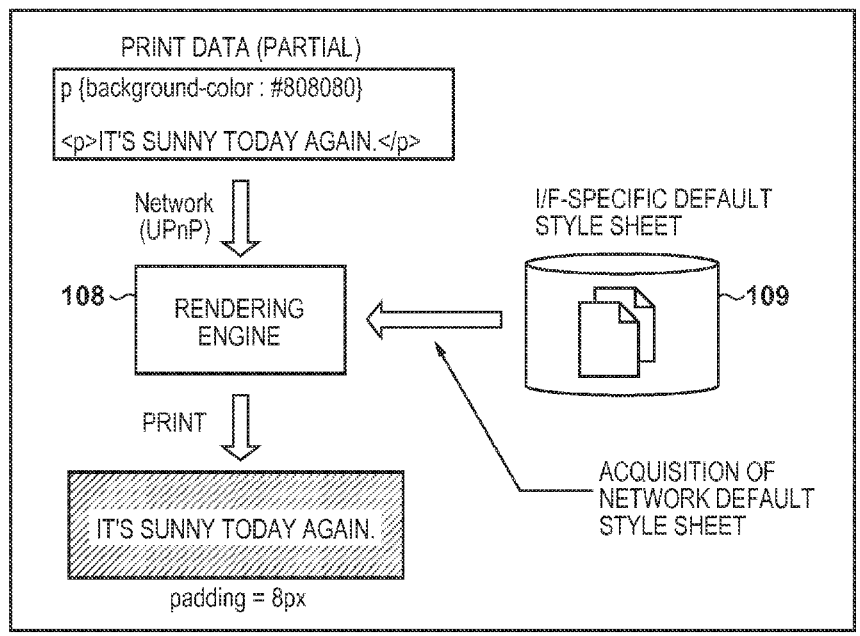
FIG. 9 is a view showing an example of processing when the printing apparatus prints via a Network I/F.

On the other hand, FIG. 9 shows an example of the processing performed when the printing apparatus 103 receives XHTML-Print data via the Network I/F and an example of printing. The XHTML-Print data is identical to the data received via the Bluetooth I/F shown in FIG. 8.

When the printing apparatus 103 receives XHTML-Print data via Network UPnP, the communication I/F identification portion 106 discriminates that the XHTML-Print data has been received from the Network I/F. The style sheet acquisition portion 107 acquires the default style sheet for the Network I/F shown in FIG. 7 from the default style sheet table 109. The rendering engine 108 renders the XHTML-Print data by using the acquired default style sheet for the Network I/F. As shown in FIG. 9, as a result of the rendering, a print result with padding corresponding to 8px being added around the text is obtained, in which the designation of "padding=8px" designated on the default style sheet for the Network I/F shown in FIG. 7 is valid.

Figure 10:
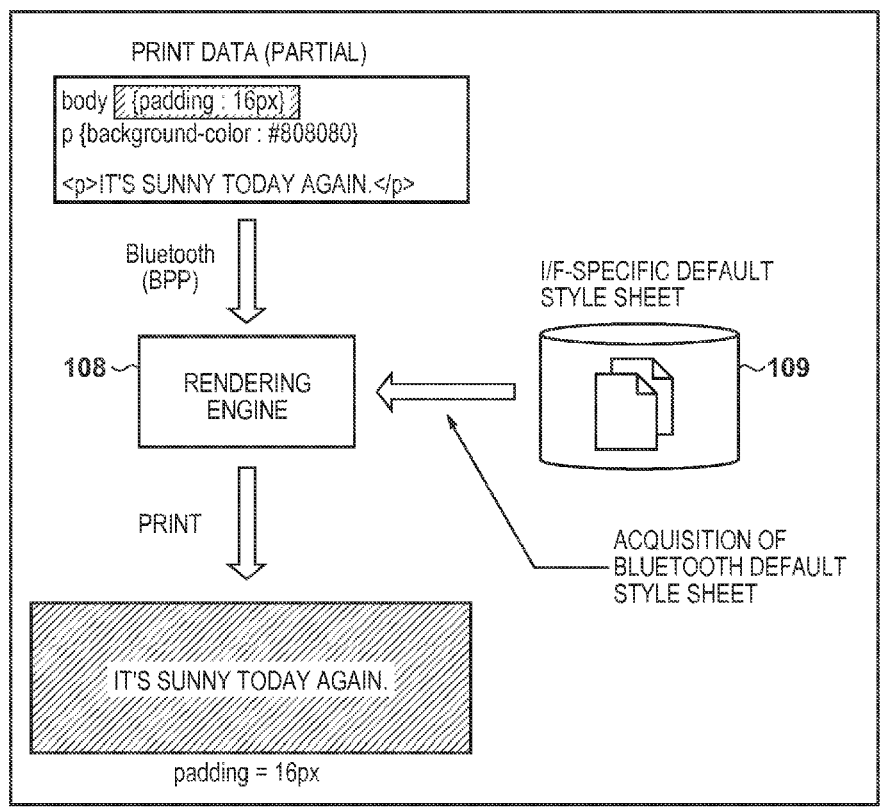
FIG. 10 is a view showing an example of processing when the printing apparatus prints via the Bluetooth I/F.

In addition, FIG. 10 shows an example of the processing performed when the printing apparatus 103 receives XHTML-Print data containing the designation of the value of the "padding" property via the Bluetooth I/F and an example of printing. In the XHTML-Print data shown in FIG. 10, the value of the "padding" property of the "body" element is designated as "16px". Note that if property values corresponding to a common setting item are set in both XHTML-Print data and a default style sheet, a higher priority is given to the property value in the XHTML-Print data.

When the printing apparatus 103 receives XHTML-Print data via the Bluetooth BPP, the communication I/F identification portion 106 discriminates that the XHTML-Print data has been received from the Bluetooth I/F. The style sheet acquisition portion 107 acquires the default style sheet for the Bluetooth I/F shown in FIG. 7 from the default style sheet table 109. The rendering engine 108 renders the XHTML-Print data by using the acquired default style sheet for the Bluetooth I/F. Note however that unlike in the case shown in FIG. 8, in the case shown in FIG. 10, since there is also the designation of the "padding" property in the XHTML-Print data, the designation in the XHTML-Print data is valid instead of the designation in the default style sheet. As shown in FIG. 10, therefore, as a result of the rendering, a print result with padding corresponding to 16px being added around the text is obtained, in which the designation of "padding=16px" designated in the XHTML-Print data is valid.

As described above, according to this embodiment, a printing apparatus including a plurality of I/Fs can print XHTML-Print data upon rendering it in accordance with the standard defined for each I/F. In addition, a rendering engine is commonly used for a plurality of I/Fs, and default style sheets are switched in accordance with the I/F in use. For this reason, there is no need to provide individual rendering engines respectively corresponding to the I/Fs. This makes it possible for a printing apparatus with limited resources to adopt this technique and flexibly cope with an increase in the number of I/Fs in the future. In addition, since the technique is implemented by default style sheets, it does not inhibit overwriting by the style sheet contained in received XHTML-Print data. It is therefore possible to print without neglecting the intention of the print data creator.

Note that this embodiment has been described by exemplifying the setting of the "padding" property as the setting of a default style sheet. Obviously, however, the present invention is not limited to this property and can be executed with various properties or other settings in the same manner as described above. For example, the present invention can be applied to a case in which borders, margins, and element colors which are to be added as properties to an element are switched in accordance with the I/F in use. When, for example, settings concerning borders are switched in accordance with the I/F in use, the position of the border may be switched to another with respect to the element or the thickness of the border may be switched to another.

In addition, this embodiment has been described by exemplifying XHTML-Print data as structured language data. Obviously, however, the embodiment is not limited to this, and can be executed with other structured language data using default style sheets in the same manner as described above.

Furthermore, this embodiment has been described by exemplifying a Bluetooth I/F and a Network I/F as communication I/Fs. However, the embodiment is not limited to this. Obviously, for example, the embodiment can be applied to various different types of communication I/Fs (a plurality of types of communication paths) such as a wireless LAN, infrared communication, cellular phone channel, and NFC. In addition, a communication I/F does not necessarily indicate a physical communication I/F, and the embodiment can also be applied to a logical communication I/F type such as a protocol type. Furthermore, the embodiment can be applied to even a case in which the same protocol is used, and communication I/Fs are selectively used via channels or the like. In other words, a plurality of types of communication paths include arbitrary combinations of two or more communication I/Fs which differ physically and two or more communication I/Fs which differ logically, and the embodiment can be applied to these combinations.

In addition, this embodiment has been described by exemplifying a printing apparatus. However, the embodiment is not limited to this, and can be applied to an image forming apparatus (multifunction peripheral) equipped with this printing apparatus, an image reading apparatus, a communication apparatus, and the like or an image processing apparatus such as an output apparatus or display apparatus. In this case, an image processing apparatus is an apparatus which includes a plurality of types of communication I/Fs or a plurality of types of communication forms (communication paths), and can receive structured language data as a processing target and execute corresponding processing (rendering or the like) in accordance with the type of communication I/F (or communication form) used for the reception of the data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus which processes structured language data, the apparatus comprising:
   a processor and a memory configure to function as:
   an acquisition unit configured to acquire structured language data as a processing target via one of a first interface and a second interface which differ physically or differ logically from one another, wherein said acquisition unit can acquire the structured language data via any of the first interface and the second interface;
   a storage unit configured to store a first style sheet and a second style sheet which respectively correspond to the first interface and the second interface and define processing methods, different from each other, for generating an image based on the structured language data acquired by said acquisition unit;
   a selection unit configured to select the first style sheet in a case where the first interface is used for the acquisition of the structured language data by said acquisition unit, and to select the second style sheet in a case where the second interface is used for the acquisition of the structured language data by said acquisition unit; and
   a processing unit configured to generate an image based on the structured language data as a processing target acquired by said acquisition unit in accordance with a processing method defined in the style sheet selected by said selection unit among the first style sheet and the second style sheet stored by said storage unit, wherein said processing unit executes the processing based on the selected style sheet in either case that the first style sheet or the second style sheet is selected by the said selection unit.

2. The apparatus according to claim 1, further comprising an output unit configured to output the image generated by said processing unit.

3. The apparatus according to claim 2, wherein said output unit comprises a print control unit configured to cause a printing apparatus to print the image generated by said processing unit.

4. The apparatus according to claim 2, wherein said output unit comprises a display control unit configured to cause a display apparatus to display the image generated by said processing unit.

5. The apparatus according to claim 1, wherein the first interface and the second interface include a Network I/F and a Bluetooth I/F.

6. The apparatus according to claim 1, wherein said processing unit physically comprises one hardware.

7. The apparatus according to claim 1, wherein the structured language data comprises XHTML-Print data.

8. A control method for an information processing apparatus including a processing unit configured to generate an image based on structured language data as a processing target and a storage unit configured to store a first style sheet and a second style sheet which respectively correspond to a first interface and a second interface and define processing methods, different from each other, for generating an image based on the structured language data, the method comprising:

a processor and a memory of the information processing apparatus executing:

an acquisition step of acquiring structured language data as a processing target via one of the first interface and the second interface which differ physically or differ logically from one another, wherein in the acquisition step, the structured language data can be acquired via any of the first interface and the second interface;

a selection step of selecting the first style sheet in a case where the first interface is used for the acquisition of the structured language data in said acquisition step, and selecting the second style sheet in a case where the second interface is used for the acquisition of the structured language data in said acquisition step; and a processing step of the processing unit generating an image based on the structured language data as a processing target acquired in the acquisition step in accordance with a processing method defined in the style sheet selected in the selection step among the first style sheet and the second style sheet stored by said storage unit, and executing the processing based on the selected style sheet in either case that the first style sheet or the second style sheet is selected in the selection step.

9. The method according to claim 8, further comprising an output step of outputting the image generated in the processing step.

10. The method according to claim 9, wherein the output step comprises a print control step of causing a printing apparatus to print the image generated in the processing step.

11. The method according to claim 9, wherein the output step comprises a display control step of causing a display apparatus to display the image generated in the processing step.

12. The method according to claim 8, wherein the first interface and the second interface include a Network I/F and a Bluetooth I/F.

13. The method according to claim 8, wherein the processing step is physically implemented by one hardware.

14. The method according to claim 8, wherein the structured language data comprises XHTML-Print data.

15. A non-transitory computer-readable storage medium storing computer executable code of a program for causing a computer to function as an information processing apparatus, the information processing apparatus including a processing unit configured to generate an image based on structured language data as a processing target and a storage unit configured to store a first style sheet and a second style sheet which respectively correspond to a first interface and a second interface and define processing methods, different from each other, for generating an image based on the structured language data, the program comprising:

code for an acquisition step of acquiring structured language data as a processing target via one of the first interface and the second interface which differ physically or differ logically from one another, wherein in the acquisition step, the structured language data can be acquired via any of the first interface and the second interface;

code for a selection step of selecting the first style sheet in a case where the first interface is used for the acquisition of the structured language data in said acquisition step, and selecting the second style sheet in a case where the second interface is used for the acquisition of the structured language data in said acquisition step; and code for a processing step of the processing unit generating an image based on the structured language data as a processing target acquired in the acquisition step in accordance with a processing method defined in the style sheet selected in the selection step among the first style sheet and the second style sheet stored by said storage unit, and executing the processing based on the selected style sheet in either case that the first style sheet or the second style sheet is selected in the selection step.

\* \* \* \* \*